US008750501B2

(12) United States Patent
Bailey et al.

(10) Patent No.: US 8,750,501 B2
(45) Date of Patent: *Jun. 10, 2014

(54) COLLABORATIVE AGENT ENCRYPTION AND DECRYPTION

(71) Applicant: International Business Machines Corporation, Armonk, NY (US)

(72) Inventors: Nicholas R. Bailey, Winchester (GB); Margaret A. Beynon, Winchester (GB); Peter Stretton, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/682,945

(22) Filed: Nov. 21, 2012

(65) Prior Publication Data

US 2013/0080766 A1 Mar. 28, 2013

Related U.S. Application Data

(63) Continuation of application No. 13/388,071, filed as application No. PCT/EP2010/060944 on Jul. 28, 2010.

(30) Foreign Application Priority Data

Jul. 31, 2009 (EP) ..................................... 09166936

(51) Int. Cl.
*H04L 29/06* (2006.01)
*G06F 21/00* (2013.01)

(52) U.S. Cl.
CPC ................................ *H04L 63/0428* (2013.01)
USPC ............................................ 380/33; 713/160

(58) Field of Classification Search
None
See application file for complete search history.

(56) References Cited

U.S. PATENT DOCUMENTS 4,802,220 A   1/1989   Marker, Jr.
5,864,625 A * 1/1999   Rutledge ........................ 380/31

(Continued)

FOREIGN PATENT DOCUMENTS

CN   1250994 A   4/2000
CN   1697365 A   11/2005

(Continued)

OTHER PUBLICATIONS

Examination Report under Section 18(3) dated Jan. 20, 2012 for Application No. GB1119252.3, 2 pages.

(Continued)

*Primary Examiner* — Gilberto Barron, Jr.
*Assistant Examiner* — Malcolm Cribbs
(74) *Attorney, Agent, or Firm* — Stephen R. Tkacs; Stephen J. Walder, Jr.; Jeffrey S. LaBaw

(57) ABSTRACT

A method for securely transmitting data from a sender computer system to a receiver computer system comprises receiving cleartext message by a first intelligent agent environment; splitting said message into a plurality of message fragments; creating an intelligent agent for each message fragment; generating a key for each message fragment; encrypting each said message fragment to produce a respective encrypted message fragment; and transmitting each intelligent agent with said respective encrypted message fragment as a data payload. The method may further comprise receiving each intelligent agent with its respective encrypted message fragment as a data payload by a second intelligent agent environment at the receiver computer system; locating each of a set of agents; decrypting each encrypted respective message fragment to produce a respective cleartext message fragment; and collaborating by the set of agents to recombine cleartext message fragments to form a cleartext message.

7 Claims, 3 Drawing Sheets

(56) References Cited

U.S. PATENT DOCUMENTS

| | | | |
|---|---|---|---|
| 6,125,186 | A | 9/2000 | Saito et al. |
| 6,396,929 | B1 | 5/2002 | Chandersekaran et al. |
| 6,745,231 | B1 | 6/2004 | Megiddo |
| 6,842,523 | B1 | 1/2005 | Niwa et al. |
| 8,291,240 | B2 | 10/2012 | Emam et al. |
| 2004/0161105 | A1 | 8/2004 | Park et al. |
| 2004/0215868 | A1* | 10/2004 | Solomon et al. ............. 710/317 |
| 2007/0074018 | A1* | 3/2007 | Edwards ....................... 713/150 |
| 2007/0086587 | A1* | 4/2007 | Farahat et al. .................. 380/28 |
| 2008/0307217 | A1* | 12/2008 | Yukimatsu et al. ........... 713/150 |

FOREIGN PATENT DOCUMENTS

| | | | |
|---|---|---|---|
| CN | 1316778 C | 5/2007 | |
| WO | WO 2006/130991 A1 | 12/2006 | |
| WO | WO2007/144215 A1 | 12/2007 | |
| WO | WO 2007144215 A1 * | 12/2007 | ............. G06F 21/00 |
| WO | WO2007145717 A1 | 12/2007 | |
| WO | WO 2011/012642 A3 | 2/2011 | |

OTHER PUBLICATIONS

International Search Report and Written Opinion dated Feb. 14, 2011 for International Application No. PCT/EP2009/065017, 10 pages.

U.S. Appl. No. 12/024,479, Oct. 2, 2012, 2 pages.

Anderson, Gustave et al., "A Secure Wireless Agent-based Testbed", Proceedings of the Second IEEE International Information Assurance Workshop, Charlotte, North Carolina, Apr. 8-9, 2004, pp. 19-32.

Aridor, Yariv et al., "Agent Design Patterns: Elements of Agent Application Design", Proceedings of Autonomous Agents, St. Paul, MI, May 1998, pp. 108-115.

Aridor, Yariv et al., "Infrastructure for Mobile Agents: Requirements and Design", 2nd International Workshop on Mobile Agents (MA'98), Stuttgart, Germany, Sep. 1998, 13 pages.

Clements, P. E. et al., "Aglets: Enabling the Virtual Enterprise", Proceedings of the International Conference on Managing Enterprises—Stakeholders, Engineering, Logistics and Achievement (ME-SELA'97), http://www.luckyspin.org/Docs/Papers/Mesela97.html,Loughborough, UK, 1997, 9 pages.

Esfandi, Abolfazl et al., "Mobile Agent Security in Multi agent Environments Using a Multi agent-Multi key Approach", Second IEEE International Conference on computer Science and Information Technology, Beijing, China, Aug. 8, 2009, pp. 438-442.

Karjoth, G. et al., "A security model for aglets", IEEE Explore, IEEE Internet Computing, IBM Research Division, Zurich, vol. 1, Issue 4, pp. 68-77, Jul./Aug. 1997, Abstract only, 1 page.

Kiniry, Joseph et al., "A Hands-On Look at Java Mobile Agents", http://faculty.washington.edu/dmzimm/publications/industry_assets/KiniryZimmerman-HandsOnJavaMobileAgents-IEEEInternetComputing97.pdf, vol. 1, No. 4, Jul./Aug. 1997, pp. 21-30.

Lawton, George, "Agents to roam the Internet", SunWorld, http://sunsite.uakom.sk/sunworldonline/swol-10-1996/swol-10-agent.html, Oct. 1996, 6 pages.

Sommers, Bret, "Agents: Not just for Bond anymore", JavaWorld, http://www.javaworld.com/javaworld/jw-04-1997/jw-04-agents.html, Apr. 1, 1997, 3 pages.

Venners, Bill, "Solve real problems with aglets, a type of mobile agent", JavaWorld, http://www.javaworld.com/javaworld/jw-05-1997/jw-05-hood.html, May 1, 1997, 3 pages.

Venners, Bill, "The architecture of aglets", JavaWorld, http://www.javaworld.com/javaworld/jw-04-1997/jw-04-hood.html, Apr. 1, 1997, 3 pages.

U.S. Appl. No. 13/388,071, Nov. 21, 2012, 2 pages.

Office Action dated Feb. 1, 2013 for U.S. Appl. No. 13/388,071; 20 pages.

Response to Office Action filed with the USPTO on Apr. 26, 2013 for U.S. Appl. No. 13/388,071; 14 pages.

* cited by examiner

COLLABORATIVE AGENT ENCRYPTION AND DECRYPTION

BACKGROUND

The present invention relates to securely transmitting data, and more particularly to achieving improved protection against the breaching of security even when data is sent over a channel subject to interception.

The securing of data during transmission has been of interest throughout human history, and secure communication has been an essential part of commerce since time immemorial.

More recently, and especially since the widespread availability of computing power and technical means of data transmission, with sophisticated means of securing data transmitted over telecommunications channels and equally sophisticated technical means of decrypting messages, there has developed a rapidly-accelerating race between those who wish to secure messages and those who wish to "crack" them.

There is a constant search for new technical means of securing data during transmission by increasing the threshold of feasibility of decryption, and an equally constant search for means of rendering feasible decryptions that were thought to be infeasible. Similarly, the processing and transmission costs of sending information securely are of concern. The volume of data to be transmitted in the course of business transactions is increasing, and the cost of using public networks is constantly decreasing, while the cost of using private networks is ever more costly. It would be advantageous to be able to send more data, especially in bulk data applications, over less costly open channels, such as the Internet, but it is difficult to secure transmissions over such a medium to the standard normally required for commercial confidentiality purpose.

Modern encryption technology allows data to be very strongly encrypted, so that the degree of effort and time to crack any given encoding is nowadays very high or almost impossible to achieve. However, two weaknesses of the traditional "encrypt data, send data, receive and decrypt data" paradigm are that (1) the data is sent as a whole and (2) only one encryption/decryption key is normally used.

Published European patent application number EP 0 993 142 A1, for example, proposes a method for providing security for data wherein the bulk of transmitted data is encrypted and transmitted over an inherently less secure channel while selected segments of data are transmitted over a normally private channel, such as the telephone network. An eavesdropper on the less secure channel is thus prevented from reading all the data. Disclosed also is the notion of using one or more scrambling algorithms to scramble data according to a formula derived from the data itself.

Published PCT patent application number WO 00/18078 proposes a method whereby a message is split and transmitted over two channels in such a manner that the portion of the message to be sent over the less secure channel is encrypted, while the portion transmitted over the secure channel remains unencrypted.

Published US Patent Application number 2004/0083361 A1 discloses a method for transmitting data securely by adaptively transforming it and spreading the transformed data piece wise over plural transmission channels.

These known techniques provide some alleviation to the security problems described above. However, in the search for ever-improved secure methods, it is desirable to find a way of further increasing the security of a message by further reducing the computational feasibility of an unauthorized person's recovering the information content of the message, while limiting the cost of processing and transmission.

SUMMARY

The illustrative embodiments provide, in a first aspect, a method for securely transmitting data from a sender computer system to a receiver computer system comprising the steps of: receiving a cleartext message by a first intelligent agent environment at said sender computer system; splitting said message into a plurality of message fragments by a splitter component of said first intelligent agent environment; creating an intelligent agent for each said message fragment by an agent creator in said first intelligent agent environment; generating a key for each said message fragment by a key generator function of each said intelligent agent; encrypting each said message fragment by an encryption function of each said intelligent agent to produce a respective encrypted message fragment; and transmitting each said intelligent agent with said respective encrypted message fragment as a data payload.

In another aspect, the method may further comprise the steps of: receiving each said intelligent agent with said respective encrypted message fragment as a data payload by a second intelligent agent environment at said receiver computer system; locating by each said intelligent agent each other of a set of agents; decrypting each said encrypted respective message fragment by a decryption function of each said intelligent agent to produce a respective cleartext message fragment; and collaborating by each said intelligent agent of said set of agents to recombine each said respective cleartext message fragment to form a cleartext message.

Preferably, said step of transmitting each said intelligent agent comprises transmitting by a route selected from a plurality of routes to exclude routes used to transmit any other of said intelligent agents. Preferably, said step of encrypting each said message fragment comprises encrypting by an encrypting function selected from a plurality of encrypting functions to exclude encrypting functions used to encrypt any other of said plurality message fragments. Preferably, wherein said step of splitting said message into a plurality of message fragments further comprises attaching sequence metadata to each of said message fragments.

Preferably, said step of collaborating to recombine comprises ordering said cleartext message fragments according to said sequence metadata. Preferably, said step of decrypting further comprises delaying until a predetermined time.

In another embodiment, an apparatus is provided for securely transmitting data from a sender computer system to a receiver computer system comprising: a first intelligent agent environment at said sender computer system operable to receive a cleartext message; a splitter component of said first intelligent agent environment operable to split said message into a plurality of message fragments; an agent creator in said first intelligent agent environment operable to create an intelligent agent for each said message fragment; a key generator of each said intelligent agent operable to generate a key for each said message fragment; an encryption component of each said intelligent agent operable to produce a respective encrypted message fragment by encrypting each said message fragment; and means for transmitting each said intelligent agent with said respective encrypted message fragment as a data payload.

The apparatus may further comprise: a second intelligent agent environment at said receiver computer system operable to receive each said intelligent agent with said respective encrypted message fragment as a data payload; means for locating by each said intelligent agent each other of a set of agents; a decryption component of each said intelligent agent operable to produce a respective cleartext message fragment by decrypting each said respective encrypted message fragment; and means for collaborating by each said intelligent agent of said set of agents to recombine each said respective cleartext message fragment to form a cleartext message.

Preferably, said means for transmitting each said intelligent agent comprises means for transmitting by a route selected from a plurality of routes to exclude routes used to transmit any other of said intelligent agents. Preferably, said encryption component comprises an encrypting function selected from a plurality of encrypting functions to exclude encrypting functions used to encrypt any other of said plurality message fragments. Preferably, said splitter component further comprises means for attaching sequence metadata to each of said message fragments. Preferably, means for collaborating to recombine comprises means for ordering said cleartext message fragments according to said sequence metadata. Preferably, step of decrypting further comprises delaying until a predetermined time.

In yet another embodiment, a computer program comprises computer program code to, when loaded into a computer system and executed, perform all the steps of the method according to the first aspect.

BRIEF DESCRIPTION OF THE SEVERAL VIEWS OF THE DRAWINGS

A preferred embodiment of the present invention will now be described by way of example only, with reference to the accompanying drawings, in which.

DETAILED DESCRIPTION

Figure 1:
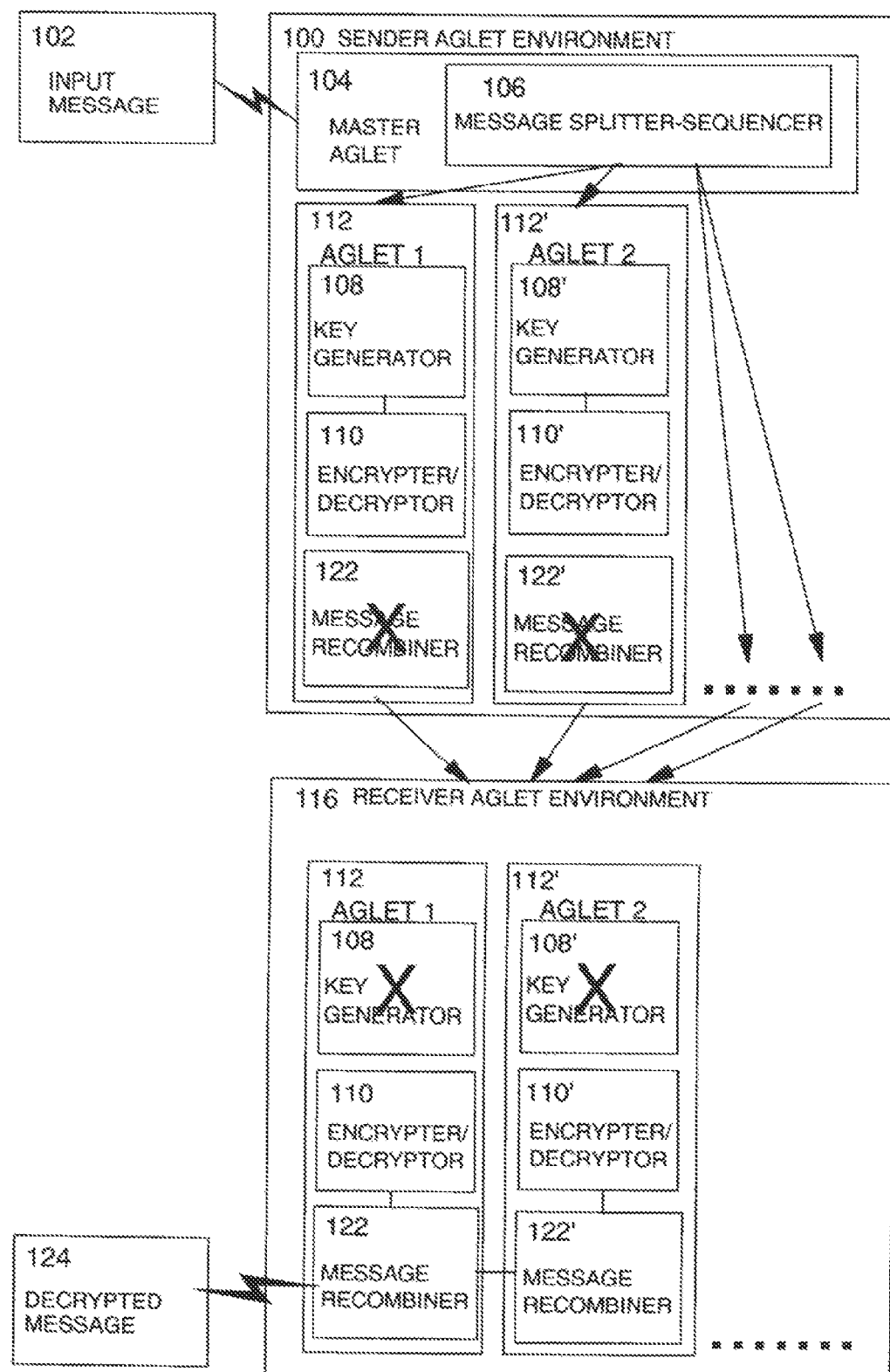
FIG. 1 is a block-level device diagram illustrating an apparatus for collaborative agent encryption and decryption in accordance with an illustrative embodiment.

An embodiment of the present invention provides secure delivery of data via multiple encrypted fragments transmitted over different routes, using inter-agent collaborative encryption and decryption, requiring all fragments to arrive at destination before they can be decrypted and reconstituted into the original complete data form. This gives added protection where data is sent via insecure or untrusted channels, and allows multiple encryption keys to be randomly generated and not passed on to any other human party.

The illustrative embodiments use multiple keys and collaborating agents to split the source data into individual fragments each encrypted with same or different algorithms using different keys. Interception and cracking of any fragment still does not give an attacker access to the whole data. This gives added protection where data is sent via insecure or untrusted distribution channels. Advantageously, no key need be disclosed to any human user at the originating and destination points/parties.

The illustrative embodiment of the present invention uses proven common portable technology such as Java and mobile agent technology and more specifically aglets. Aglets are already well-known in the art, having been invented by researchers at the IBM Tokyo Research Laboratory and well publicized in both commercial and academic publications, but a few notes on them and on their use may be found helpful. The Aglet Software Developer's Kit (ASDK) is provided freely under an Open Source license and is available for download from the World Wide Web by software developers interested in using it. In brief, aglets are agent objects with defined sets of methods that enable them to behave in an autonomous fashion, in instantiating themselves in response to a particular "stimulus", and then in serializing their program code and data in order to autonomously send themselves to remote systems. They are further capable of cloning themselves for various purposes, one of which is so that they can forward copies of themselves to remote systems. Aglets have further capabilities which can be programmatically activated, such as the capability of communicating in certain constrained ways with their host systems and also with other aglets present in the same host system.

Data to be securely sent from A to B is processed by plural mobile agents, such as the aglets described. The data starts by being passed as cleartext to a secure agent environment in which agents can be created. The agents divide the source data between them, each encrypting its fragment with its own key. The fragmentation can be as convoluted as required to ensure that should any one fragment ever be cracked then there is still insufficient data in an understandable form to be of much use. For example, a very simple fragmentation would be to split the data into two fragments where each fragment contained every other word, i.e. words 1, 3, 5, 7 ... and words 2, 4, 6, 8 ....

At the time of fragmentation each agent knows how many other agents are involved and their identities and what specific fragment they are each responsible for.

The agents then send their encrypted data fragments to the destination using whatever routing paths they have each chosen. The agents then propagate themselves to the destination agent environment. The secure destination environment then hosts the data fragments and agents until all original fragments and agents have arrived. While in holding, each agent checks for its own data fragment and interacts with the other agents to each establish that all known originating agents have arrived and that each of these agents confirms it has its respective data fragment as a payload. Once this has happened then the agents can individually decrypt their own data fragments and then collaborate to piece the fragments back together again to form a whole.

At no point is a single encryption key disclosed, thus allowing data to be sent seamlessly from one secure environment to another secure environment with effective automatic encryption and decryption. Additionally, deliberate time delays can be injected into the system so that data arrives spread over any period of time. Arrival of the last fragment need not be the final decryption time either, as the agents can at source be instructed not to collaborate to decrypt the data until a given date and time.

Source and destination consist of secure environments that can host mobile agents and data. Data to be securely transmitted is introduced into the secure environment, preferably together with other applicable parameters, such as the number of fragments, time parameters and the number of transmission routes to be used.

The parameters and data are preferably processed by a master agent/aglet. The purpose of the master agent is:

1. From the parameters and type of data to determine the number of agents required. Additional parameters and/or factors can be calculated according to a master agent rule set, taking into account available resources and any other external factors.

2. To create/spawn the desired number of agents/aglets.

3. To give all agents a unique identifier key that allows the agents to recognize and communicate with each other at the target location. If required this key, or another allocated key, can also be used to encrypt inter-agent communication.

4. To slice/fragment the source data and give each sub agent its associated data and metadata indicating how that data was fragmented. The fragmentation could be simple or complex. A complex example could be for example: generating segments of differing lengths using a looping combination of head and tail functions where each successive head segment is snipped from the data at a length interval determined by a constrained pseudo-random number generator.

The sub agents/aglets encrypt their allocated data fragments with self generated random keys and choice of algorithm, and then send/route the data fragments to the desired destination. They then propagate themselves to the target location on an alternative route if possible. The agents can delay their departure so as to not be in the same time frame as the data. As part of the collaboration process at the fragmentation, encryption and propagation stage then agents can ensure that they do not all use the same connections and routes to the target destination or that they use those routes with suitable delays to reduce their chances of place and time coexistence.

On arrival at the secure environment the data and agents are hosted/congregated until all parties are present. The agents are operable to communicate with one another to confirm that they have each arrived intact and not been compromised and they then collaborate in the fragment decryption and reassembly process to reconstruct the original data in its original form.

Turning now to FIG. 1, there is shown a block-level device diagram illustrating an apparatus for collaborative agent encryption and decryption in accordance with an illustrative embodiment.

FIG. 1 shows sender aglet environment 100, which is cooperable with a network to receive input message 102. On receipt of input message 102, master aglet 104 is instantiated and causes a method to be invoked to split the message into sequential fragments identified with sequence metadata by message splitter-sequencer 106. Master aglet 104 spawns a plurality of aglets 112, 112' shown here as AGLET 1, AGLET 2 . . . . The number of aglets is determined as previously described, but only two are shown here, for ease of understanding of the figure and for brevity of description. Aglets 112, 112' are operable to invoke methods to generate keys by key generators 108, 108', and to encrypt their respective fragments of the message by invoking methods of encryptor/decryptors 110, 110'. As aglets 112, 112' are instantiated at the sender aglet environment, additional methods for recombining message fragments by message recombiners 122, 122' are disabled. As will be clear to one of ordinary skill in the art, aglets may contain a plurality of methods that are enabled or disabled depending on the environment in which the aglets are instantiated, as well as on other externally or internally generated stimuli.

Aglets 112, 112' are operable to cause themselves to be transmitted across a network, for example, a wide area network, such as the Internet from sender aglet environment 100 to receiver aglet environment 116. Aglets 112, 112' may carry their encrypted data fragments as data pay loads, or they may operate to send their data payloads separately across the network and receive them from the network at receiver aglet environment 116.

On arrival in aglet environment 116, aglets 112, 112' are activated and operable to communicate with one another using methods which are well known in the art. The aglets 112, 112' cooperate to determine when all the related aglets have arrived at receiver aglet environment (and optionally when any separately transmitted data has arrived), so that all the message fragments can be decrypted and reassembled. Alternatively, even when all fragments have arrived, the aglets 112, 112' may delay further processing until some predetermined time. When all aglets 112, 112' are ready, they invoke encryptor/decryptor methods 110, 110' to decrypt their respective fragments and then invoke message recombiner methods 122, 122' to recombine the fragments according to the sequence metadata that was packaged with them by message splitter-sequencer 106. On completion of their decryption and recombining methods, aglets 112, 112' are operable to provide the decrypted and reassembled message 124.

Figure 2:
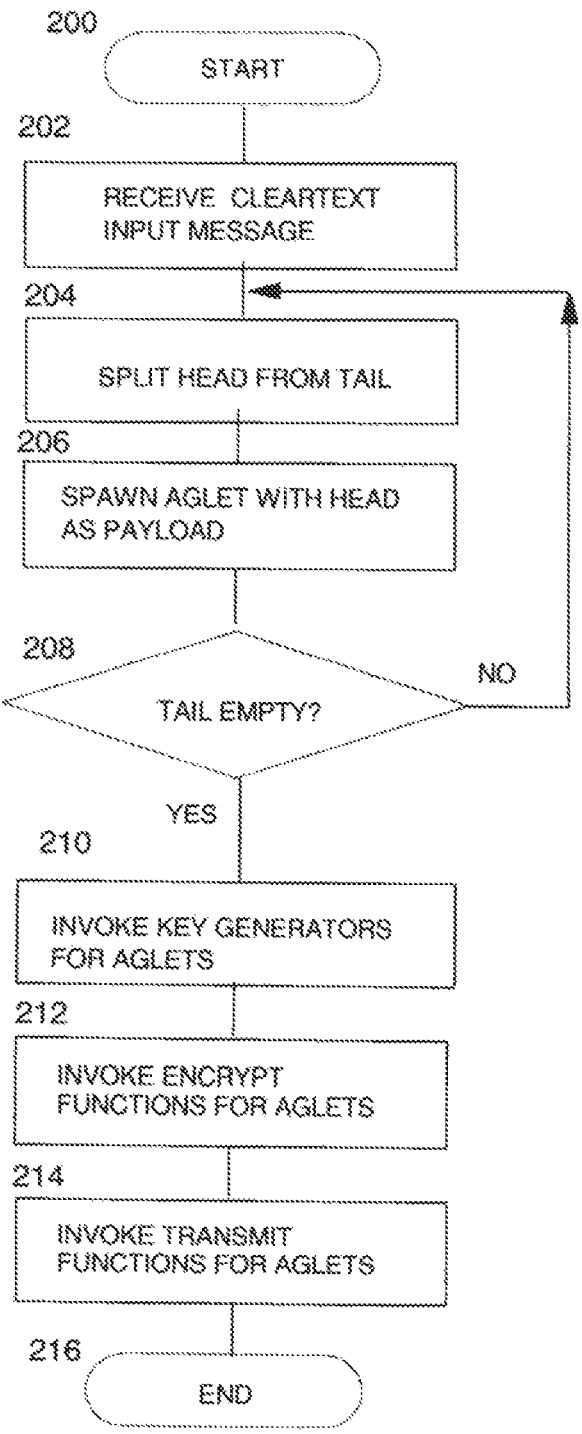
FIG. 2 is a process flow diagram representing operation of transmitting an encrypted message according to an illustrative embodiment.

Turning now to FIG. 2, there are shown the steps of the transmission portion of a method according to an illustrative embodiment. FIG. 2 also illustrates the computer program code steps required to implement an embodiment of the present invention in a computer program product, but for brevity, the method steps will be described here. It will be clear to those skilled in the programming art that the method lends itself to embodiment in program code implementing each of the logical method steps.

The method begins at START step 200, and at step 202 the cleartext message 102 is received into the sender aglet environment 100. At step 204, the process of splitting the message into fragments by message splitter-sequencer 106 begins. Using a head-and-tail process, at step 204 the head fragment is split from the tail fragment and at step 206, an aglet is spawned (created) with the head fragment as its payload. The processing of the next head fragment follows through steps 204, 206 until, at test step 208, it is determined that the tail is empty—that is, there are no more fragments of the message to be processed. At step 210, the key generator functions 108, 108' . . . for each aglet are invoked, and at step 212, the encrypt functions 110, 110' . . . are invoked for each aglet. At step 214, the transmit functions are invoked for each aglet and at END step 216, the transmission portion of the method of the preferred embodiment completes.

Figure 3:
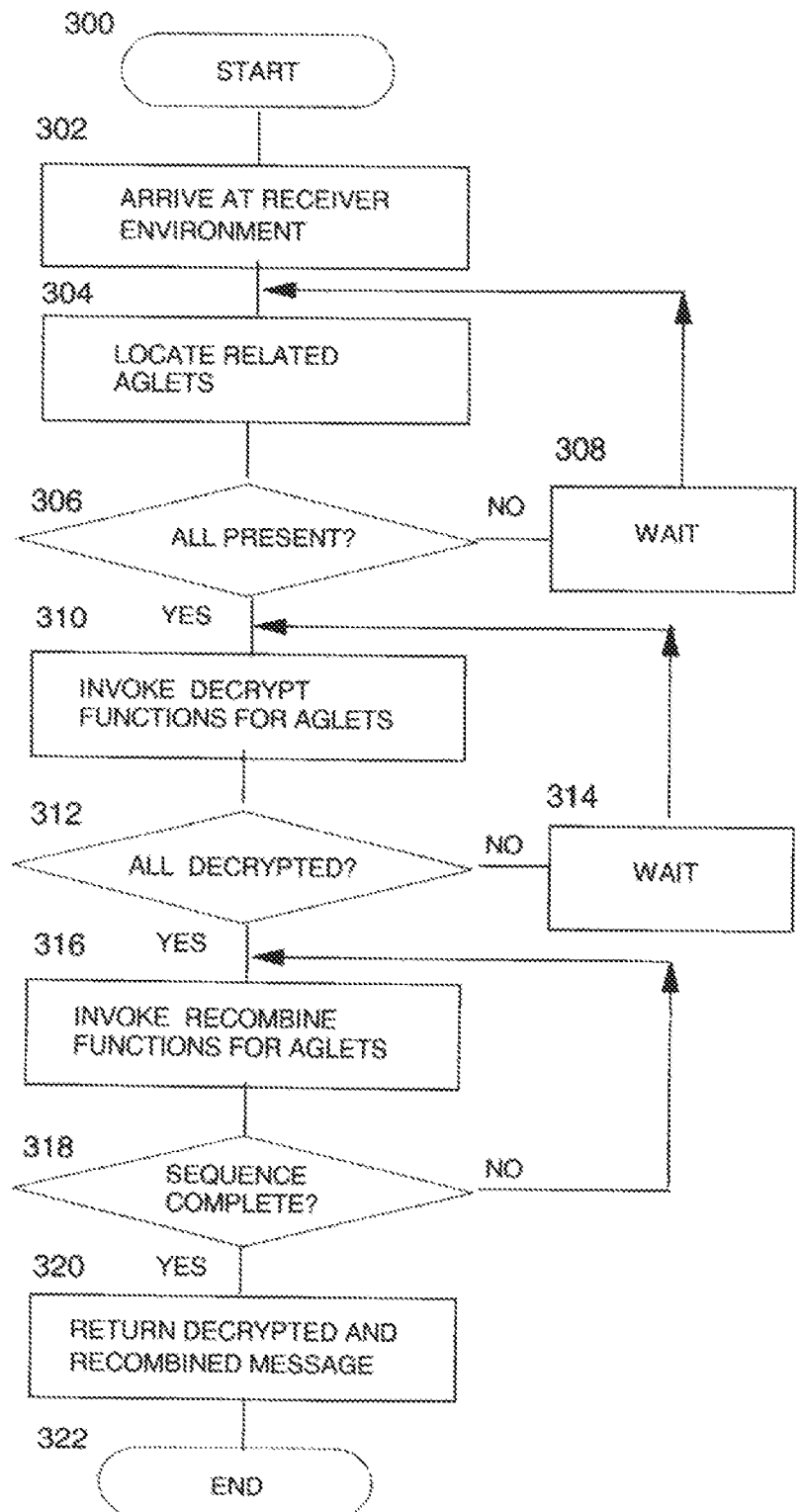
FIG. 3 is a process flow diagram representing operation of receiving and decrypting a message according to an illustrative embodiment.

Turning now to FIG. 3, there are shown the steps of the receiving portion of a method according to an illustrative embodiment. FIG. 3 also illustrates the computer program code steps required to implement an embodiment of the present invention in a computer program product, but for brevity, the method steps will be described here. It will be clear to those skilled in the programming art that the method lends itself to embodiment in program code means implementing each of the logical method steps.

The method begins at START step 300, and at step 302 an aglet 112, 112' . . . arrives at receiver aglet environment 116. The iteration comprising locate related aglets step 304, "all present?" test step 306 and wait step 308 performs the function of ensuring that all related aglets 112, 112' . . . are present in the receiver aglet environment 116. At test step 310, the decrypt functions 110, 110' . . . are invoked for the message fragments that are carried as payloads by each aglet 112, 112' . . . , and the process iterates through test step 312, wait step 314 and decrypt step 310 until all the message fragments have been decrypted. At step 316 the recombine functions 122, 122' . . . are invoked for each aglet, and the process iterates through test step 318 until the sequence is completed—that is, until the decrypted message fragments have been recombined into a cleartext or decrypted message 124.

At step 320, the decrypted and recombined message is returned, and at END step 322, the receiving portion of the method completes.

It will be clear to one of ordinary skill in the art that all or part of the method of the illustrative embodiments may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the illustrative embodiments may suitably be embodied in a logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the illustrative embodiments may be realized in the form of a computer implemented method of deploying a service comprising steps of deploying computer program code operable to, when deployed into a computer infrastructure and executed thereon, cause said computer system to perform all the steps of the method.

In a further alternative, the illustrative embodiments may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method for securely transmitting data from a sender computer system to a receiver computer system comprising
   receiving an unencrypted message by a first intelligent agent environment at said sender computer system;
   splitting said unencrypted message into a plurality of message fragments by a splitter component of said first intelligent agent environment;
   creating an intelligent agent for each said message fragment by an agent creator in said first intelligent agent environment to form a set of intelligent agents;
   generating a key for each said message fragment by a key generator function of each said intelligent agent;
   encrypting each said message fragment by an encryption function of each said intelligent agent to produce a respective encrypted message fragment using a key generated by the key generator of the intelligent agent; and
   transmitting each said intelligent agent with said respective encrypted message fragment as a data payload to the receiver computer system.

2. The method according to claim 1, further comprising
   receiving each said intelligent agent with said respective encrypted message fragment as a data payload by a second intelligent agent environment at said receiver computer system;
   locating by each said intelligent agent each other of the set of intelligent agents,
   decrypting each said encrypted respective message fragment by a decryption function of each said intelligent agent to produce a respective unencrypted message fragment; and
   collaborating by each said intelligent agent of said set of agents to recombine each said respective unencrypted message fragment to form a received message.

3. The method according to claim 1 wherein transmitting each said intelligent agent comprises transmitting by a route selected from a plurality of routes to exclude routes used to transmit any other of the set of intelligent agents.

4. The method according to claim 1 wherein encrypting each said message fragment comprises encrypting by an encrypting function selected from a plurality of encrypting functions to exclude encrypting functions used to encrypt any other of said plurality of message fragments.

5. The method according to claim 1 wherein splitting said message into a plurality of message fragments further comprises attaching sequence metadata to each of said message fragments.

6. The method according to claim 2 wherein splitting the message into a plurality of message fragments comprises attaching sequence metadata to each of the message fragments and wherein collaborating to recombine comprises ordering said unencrypted message fragments according to said sequence metadata.

7. The method according to claim 2 wherein encrypting further comprises delaying until a predetermined time.

\* \* \* \* \*